Patented Mar. 5, 1929.

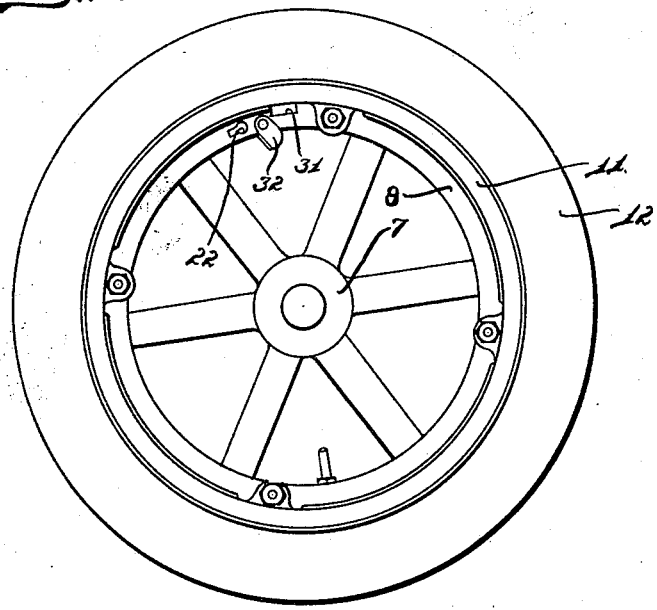

1,704,490

UNITED STATES PATENT OFFICE.

VINCENT SZYMANSKI, OF DETROIT, MICHIGAN.

TIRE-RIM LOCK.

Application filed February 18, 1928. Serial No. 255,297.

My invention relates to a new and useful improvement in a tire rim lock adapted for locking the tire rim against removal from the wheel with which used.

It is an object of the present invention to provide a lock of this type which will be simple in structure, economical of manufacture, composed of a minimum number of parts, and easily and quickly assembled.

It is another object of the invention to provide a lock of this class in which a retractable finger is used for locking purposes which is withdrawn from locking position in a series of steps.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of a wheel showing my invention applied.

Fig. 2 is a central longitudinal sectional view of the invention showing it applied.

Fig. 3 is a view taken on line 3—3 of Fig. 2.

Fig. 4 is a sectional view taken on line 4—4 of Fig. 3.

Fig. 5 is a sectional view taken on line 5—5 of Fig. 2.

In the drawings I have illustrated the invention used with a wheel 7 having a felly 8, the sides of which are outwardly turned to provide the rim engaging flanges 9 and 10 against the outer ends of which engage the rim 11 upon which is positioned the tire 12. Mounted on the inner surface of this rim 11 is a plug 13 preferably formed from metal and provided with a centrally disposed recess 14 in which is adapted to slidably engage a slidably positioned arcuate locking finger 15. Mounted upon the outer surface of the felly 8 between the flanges 9 and 10 is a housing 16 which is provided in its end walls with the openings 17 and 18 through which the locking finger 15 is projected as shown in Fig. 2. This locking finger is provided on its undersurface with a plurality of teeth 19 and a plurality of notches 20.

Formed in the side wall 21 of the housing is a key hole 22 extending into which is a pin 23 projecting from the side wall 24. Mounted in the side walls 21 and 24 is a pin 25 on which are formed the spaced teeth 26. A bow shaped leaf spring 27 is positioned in the housing and engaging at its opposite ends the inner surface of the top of the housing adjacent the ends thereof, this top being cut away as at 28.

In operation, after the locking finger 15 is mounted in position. a pin 29 is projected through one end of the finger 15, this pin preventing withdrawal of the locking finger from the housing. The opposite end of the finger 15 is provided with a heel 30 which prevents the passage of the locking finger 15 through the housing.

In operation, after the device has been mounted on the felly 8 in the manner shown in Fig. 2, the locking finger 15 may be retracted to disengage from the recess 14. This rim may then be moved axially from the felly 8, the flange 10 being cut away as at 31. In order to retract the locking finger 15, a suitable key having a hollow stem is inserted through the key hole 22, the pin 23 engaging in the stem of the key and serving as a guide.

The tongues 26 will be differently spaced depending upon the nature of notches cut in the key. The key is then rotated to engage in the notches 20, each rotation of the key effecting a retraction of the locking finger 15 the space of one of the notches 20 so that in the type shown in Fig. 2 three rotations of the key would be necessary for retraction of the locking finger to inoperative position. At each rotation the locking finger 15 is moved upwardly in the housing against the tension of the spring 27 sufficiently to permit the teeth 19 to clear the edge of the opening 18. A shield 32 is provided as a closure for the key hole opening 22.

In assembling the device, the spring 27 may be adjusted to proper position through the opening 28.

It is obvious from the description that the device is comprised of but few parts and may be easily and quickly assembled while at the same time its simplicity of structure permits an economical and durable arrangement.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A device of the class described adapted for use with a vehicle wheel having a felly and a rim mountable thereon, comprising: a housing on said felly; a locking member projectable outwardly from said housing; means on one side of said locking member for engaging said housing and preventing movement of the same relatively thereto longitudinally of said member; resilient means for retaining said member in engagement with said housing; and a recess bearing member projecting inwardly from said rim, said locking member engageable, upon projection outwardly from said housing, in said recess, and locking said rim against removal from said felly.

2. A device of the class described adapted for use with a felly having a rim mounted thereon, comprising: a housing having openings formed in its end walls; a locking bar projected through said openings and adapted for extending outwardly from said housing; teeth on the undersurface of said locking member engageable with the edge of the opening in said housing for resisting movement of said locking member longitudinally; a recess bearing member mounted on and projecting radially inwardly from said rim, said locking member engaging in said recess upon projection outwardly of said housing; and a spring in said housing normally retaining said locking member in engagement with the edge of said opening.

3. A device of the class described adapted for use with a vehicle wheel having a felly and a rim mountable thereon, comprising: a housing mounted on said felly; an arcuate locking member projected through openings formed in opposite walls of said housing; teeth on the underside of said locking member adjacent one end engageable with the edge of the opening in said housing, and while in engagement, preventing longitudinal movement of said locking member; a bow-shaped leaf spring in said housing normally retaining said locking member in engagement with the edge of said housing; a recess bearing member mounted on and projecting radially inwardly from said rim, said locking member engaging in said recess upon projection outwardly from said housing, one side of said housing having a key opening formed therein; and a pin projecting from the inner face of the opposite wall of said housing in alignment with said key opening.

In testimony whereof I have signed the foregoing specification.

VINCENT SZYMANSKI.